United States Patent [19]

Sekimoto et al.

[11] Patent Number: 4,920,425
[45] Date of Patent: Apr. 24, 1990

[54] VIDEO SIGNAL RECORDING AND REPRODUCING APPARATUS

[75] Inventors: Kunio Sekimoto; Takeshi Morimoto, both of Osaka, Japan

[73] Assignee: Matsushita Electric Industrial Co., Ltd., Japan

[21] Appl. No.: 153,406

[22] Filed: Feb. 8, 1988

[30] Foreign Application Priority Data

Feb. 9, 1987 [JP] Japan .................. 62-27730

[51] Int. Cl.⁵ .................. H04N 9/80; H04N 9/88
[52] U.S. Cl. ........................ 358/334; 358/314; 358/906
[58] Field of Search .......... 358/311, 312, 313, 320, 358/330, 324, 325, 326, 334, 310, 906, 909

[56] References Cited

U.S. PATENT DOCUMENTS

| | | | |
|---|---|---|---|
| 3,553,355 | 1/1971 | Forster | 358/311 |
| 3,684,826 | 8/1972 | Hurst . | |
| 3,878,557 | 4/1975 | Vidovic . | |
| 3,890,638 | 6/1975 | Bargen . | |
| 4,052,733 | 10/1977 | Derenbecher, Jr. . | |
| 4,115,800 | 9/1978 | Sakamoto . | |
| 4,214,259 | 7/1980 | Chang | 358/321 |
| 4,261,008 | 4/1981 | Waller et al. | 358/320 |
| 4,370,672 | 1/1983 | Ross et al. . | |
| 4,376,954 | 3/1983 | Ross | 358/313 |
| 4,507,686 | 3/1985 | Kimura | 358/906 |
| 4,507,689 | 3/1985 | Kozuki et al. | 358/906 |
| 4,677,459 | 6/1987 | Kaminaga | 358/320 |
| 4,725,895 | 2/1988 | Miyamoto et al. | 358/324 |
| 4,733,294 | 3/1988 | Wesolowski | 358/325 |
| 4,746,990 | 5/1988 | Katoh et al. | 358/310 |

FOREIGN PATENT DOCUMENTS 0202919 11/1986 European Pat. Off. .
86/04760 2/1986 PCT Int'l Appl. .

Primary Examiner—Donald McElheny, Jr.
Attorney, Agent, or Firm—Lowe, Price, LeBlanc, Becker & Shur

[57] ABSTRACT

A video signal recording and reproducing apparatus includes a first device for inputting a video signal and a second device for recording the video signal as component signals. In addition, a third device serves to generate a color frame signal from color frame information contained in the video signal. A fourth device serves to record the color frame signal. A fifth device serves to reproduce the component signals and the color frame signal. A sixth device serves to output the reproduced component signals and the reproduced color frame signal.

10 Claims, 3 Drawing Sheets

VIDEO SIGNAL RECORDING AND REPRODUCING APPARATUS

BACKGROUND OF THE INVENTION

This invention relates to a video signal recording and reproducing apparatus such as a video tape recorder.

PCT published international application WO 86/04760 discloses a video signal processing apparatus usable in a video tape recorder and others. In the apparatus of application WO 86/04760, reproduced component video signals, that is, reproduced luminance and chrominance signals fail to have color frame information. Accordingly, in cases where a dubbing process or an editing process is performed on the reproduced component video signals, a problem arises in phase during signal encoding.

SUMMARY OF THE INVENTION

It is an object of this invention to provide a video signal recording and reproducing apparatus which prevents a phase problem during signal encoding in cases where a dubbing process or an editing process is performed on reproduced component video signals.

A video signal recording and reproducing apparatus of this invention includes a first device for inputting a video signal and a second device for recording the video signal as component signals. In addition, a third device serves to generate a color frame signal from color frame information contained in the video signal. A fourth device serves to record the color frame signal. A fifth device serves to reproduce the component signals and the color frame signal. A sixth device serves to output the reproduced component signals and the reproduced color frame signal.

BRIEF DESCRIPTION OF THE DRAWINGS

Like and corresponding elements are denoted by the same reference characters throughout the drawings.

DESCRIPTION OF THE FIRST PREFERRED EMBODIMENT

Figure 1:
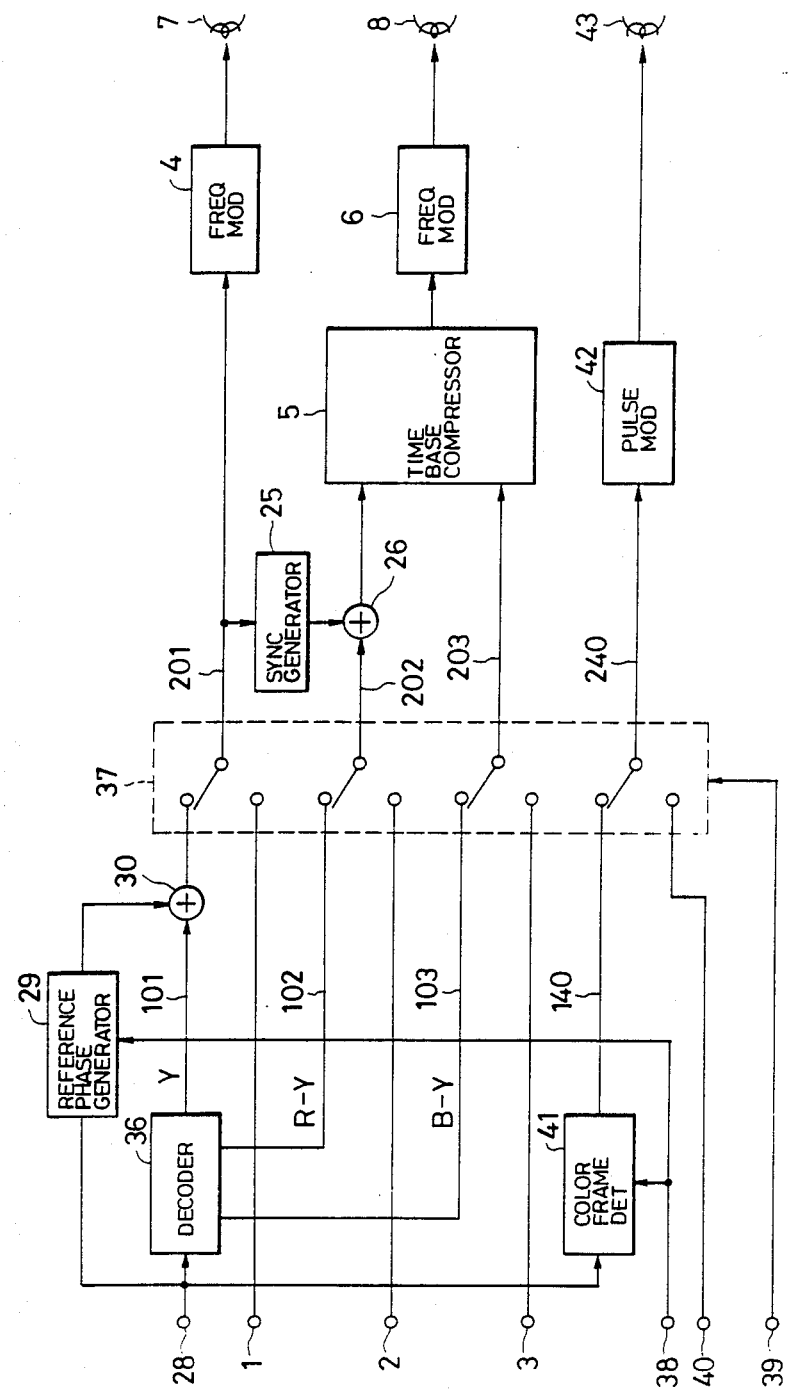
FIG. 1 is a block diagram of a recording section of a video signal recording and reproducing apparatus according to a first embodiment of this invention.

FIG. 1 shows a recording section of a video signal recording and reproducing apparatus according to a first embodiment of this invention. As shown in FIG. 1, the recording section includes input terminals 1, 2, and 3 for receiving a luminance (Y) signal, a first component chrominance (R-Y) signal, and a second component chrominance (B-Y) signal respectively. The Y signal, the R-Y signal, and the B-Y signal received via the input terminals 1, 2, and 3 are applied to a multiple switch 37.

The recording section includes input terminals 28 and 38 for receiving a composite video signal and a discrimination signal respectively. The composite video signal received via the input terminal 28 is applied to a reference phase signal generator 29, a decoder 36, and a color frame detector 41. The discrimination signal received via the input terminal 38 is applied to the reference phase signal generator 29 and the color frame detector 41.

Generally, composite video signals are of two types, that is, a standard type and a nonstandard type. In the case of a standard composite video signal, a chrominance subcarrier and a luminance signal (a horizontal sync signal) are synchronous. In the case of a nonstandard composite video signal, a chrominance subcarrier and a luminance signal (a horizontal sync signal) are nonsynchronous. The discrimination signal subjected to the input terminal 38 represents whether the composite video signal to be recorded is of the standard type or the nonstandard type.

The decoder 36 derives a luminance (Y) signal 101, a first component chrominance (R-Y) signal 102, and a second component chrominance (B-Y) signal 103 from the composite video signal. The Y signal outputted from the decoder 36 is applied to an adder 30. The R-Y signal and the B-Y signal outputted from the decoder 36 are applied to the switch 37.

The generator 29 outputs a reference phase signal which is generated in accordance with the composite video signal. The reference phase signal has a frequency equal to the frequency of a chrominance subcarrier. The reference phase signal may be synchronous with the chrominance subcarrier. Specifically, the generator 29 produces the chrominance subcarrier from a burst signal or a VIR signal in the composite video signal and then generates the reference phase signal in accordance with the produced chrominance subcarrier. The generator 29 is enabled and disabled in accordance with the discrimination signal. When the discrimination signal represents that the input composite video signal is of the standard type, the generator 29 is enabled so that the reference phase signal is outputted from the generator 29. When the discrimination signal represents that the composite video signal is of the nonstandard type, the generator 29 is disabled so that no reference phase signal is outputted from the generator 29.

When the composite video signal is of the standard type, the Y signal outputted from the decoder 36 and the reference phase signal outputted from the generator 29 are added by the device 30 to form a second Y signal which is applied to the switch 37. Specifically, the reference phase signal is inserted into the Y signal during a predetermined period corresponding to one line interval of a vertical blanking period. The reference phase signal may be inserted into the Y signal during a period where a burst signal occurs. When the composite video signal is of the nonstandard type, the Y signal outputted from the decoder 36 passes through the adder 30 as it is and then the Y signal is applied to the switch 37.

The device 41 performs color frame detection on the composite video signal. The color frame detector 41 is enabled and disabled in accordance with the discrimination signal. When the composite video signal is of the standard type, the detector 41 is enabled to derive a color frame signal 140 from the composite video signal. The color frame signal outputted from the detector 41 is applied to the switch 37. When the composite video signal is of the nonstandard type, the detector 41 is disabled so that no color frame signal is outputted from the detector 41.

The recording section includes an input terminal 40 for receiving an external color frame signal. The color frame signal received via the input terminal 40 is applied to the switch 40.

The recording section further includes an input terminal 39 for receiving an input change signal. The received input change signal is applied to a control terminal of the switch 37.

The switch 37 selects a set of the Y signal outputted from the adder 30, the R-Y signal outputted from the decoder 36, the B-Y signal outputted from the decoder 36, and the color frame signal outputted from the detector 41 or a set of the Y signal, the R-Y signal, the B-Y signal, and the color frame signal transmitted via the input terminals 1, 2, 3, and 40 in accordance with the input change signal, and feeds the selected set of the signals to following stages.

The switch 37 outputs a selected Y signal 201 to a fequency modulator 4 and a sync signal generator 25. The switch 37 outputs a selected R-Y signal 202 to an adder 26. The switch 37 outputs a selected B-Y signal 203 to a time base compressor 5. The switch 37 outputs a selected color frame signal 240 to a control pulse modulator 42.

The Y signal 201 is modulated in frequency by the modulator 4 before being recorded in a magnetic tape via a magnetic head 7.

The generator 25 generates a sync signal in accordance with a horizontal sync signal included in the Y signal 201. The sync signal outputted from the generator 25 is added by the device 26 to the R-Y signal 202, forming a second R-Y signal which includes sync components. The R-Y signal outputted from the adder 26 is applied to the time base compressor 5.

The R-Y signal and the B-Y signal undergo a time base compression process in the device 5. The compression of the R-Y signal and the B-Y signal is performed in unit of 1 line. The compression is designed so as to halve time bases. After the time base compression process, the compressed R-Y signal and the compressed B-Y signal are combined into a single composite color signal having a form expressed as (R-Y)(B-Y)(R-Y)(B-Y) . . . , where the character (R-Y) denotes the R-Y signal compressed to ½ line and the character (B-Y) denotes the B-Y signal compressed to ½ line. The composite color signal outputted from the time base compressor 5 is applied to a frequency modulator 6.

The composite color signal is modulated in frequency by the modulator 6 before being recorded in the magnetic tape via a magnetic head 8.

Figure 3:
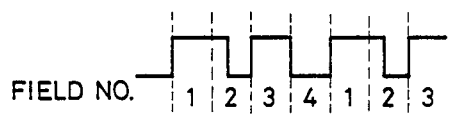
FIG. 3 shows a waveform of a control signal including superposed color frame components.

The device 42 modulates a control pulse signal in accordance with the color frame signal 240. As shown in FIG. 3, the resulting modulated control pulse signal has a longer positive pulse and a shorter negative pulse in each pair of adjacent first and second fields and have a normal positive pulse and a normal negative pulse in each pair of adjancent third and fourth fields. In this way, the color frame information is superposed on the control pulse signal via the pulse width or duty cycle adjustment. It should be noted that a series of first, second, third, and fourth fields periodically reiterates in an NTSC video signal.

The modulated control pulse signal outputted from the modulator 42 is recorded in the magnetic tape via a magnetic head 43.

In cases where a composite video signal is inputted into the recording section of FIG. 1 via the input terminal 28, the input change signal applied to the input terminal 39 forces the switch 37 to select a set of a Y-signal outputted from the adder 30, an R-Y signal outputted from the decoder 36, a B-Y signal outputted from the decoder 36, and a color frame signal outputted from the detector 41. In these cases, when the composite video signal is of the nonstandard type, the reference phase signal generator 29 is disabled via the discrimination signal applied via the input terminal 38 so that the Y signal outputted from the decoder 36 moves to the switch 37 through the adder 30 as it is. In addition, when the composite video signal is of the nonstandard type, the color frame detector 41 is disabled via the discrimination signal and thus no color frame signal is outputted from the detector 41, and the modulator 42 performs the adjustment of the pulse width or duty cycle of a control pulse signal in a self-control or self-running manner. On the other hand, when the composite video signal is of the standard type, the reference phase signal generator 29 is enabled so that a combination of a reference phase signal outputted from the generator 29 and the Y signal outputted from the decoder 36 is applied to the switch 37 as a second Y signal. When the composite video signal is of the standard type, the color frame detector 41 is enabled so that a color frame signal is outputted from the detector 41. As described previously, the signals selected by the switch 37 undergo signal processing in the devices 4, 5, 6, 25, 26, and 42 before being recorded in a magnetic tape via the magnetic heads 7, 8, and 43.

In cases where component signals are inputted into the recording section of FIG. 1 via the input terminals 1, 2, 3, and 40, the input change signal applied to the input terminal 39 forces the switch 37 to select a set of the signals transmitted via the input terminals 1, 2, 3, and 40. The selected signals undergo signal processing in the devices 4, 5, 6, 25, 26, and 42 before being recorded in a magnetic tape via the magnetic heads 7, 8, and 43. During an initial stage where the color frame signal is absent, the modulator 42 performs the adjustment of the pulse width or duty cycle of a control pulse signal in a self-control or self-running manner.

Figure 2:
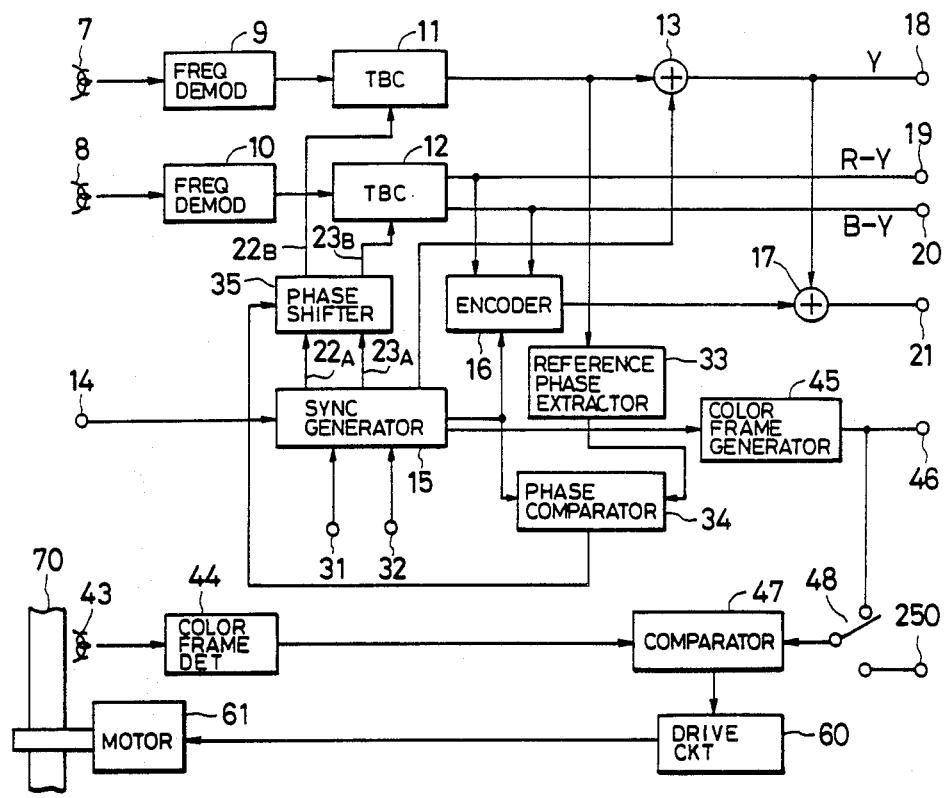
FIG. 2 is a block diagram of a reproducing section of the video signal recording and reproducing apparatus according to the first embodiment of this invention.

FIG. 2 shows a reproducing section of the video signal recording and reproducing apparatus according to the first embodiment of this invention. As shown in FIG. 2, the reproducing section includes frequency demodulators 9 and 10 receiving reproduced signals from the magnetic heads 7 and 8 respectively.

The device 9 demodulates the input signal in frequency and thus derives a reproduced Y signal therefrom which is inputted into a time base corrector (TBC) 11. The TBC 11 corrects the input Y signal in time base and thus derives a second reproduced Y signal which is applied to an adder 13 and a reference phase signal extractor 33. Sync components of the reproduced Y signal are replaced by noise-free sync components as will be described hereinafter. The TBC 11 removes sync components from the Y signal. A reference sync signal outputted from a sync signal generator 15 to the adder 13 is added to the Y signal by the adder 13, forming a third reproduced Y signal which is applied from the adder 13 to an output terminal 18 and an adder 17.

The device 10 demodulates the input signal in frequency and thus derives a reproduced composite chrominance signal therefrom which is inputted into a time base corrector (TBC) 12. The TBC 12 divides the input composite chrominance signal into a reproduced R-Y signal and a reproduced B-Y signal and corrects the R-Y signal and the B-Y signal to expand their time bases to the original lengths. In this way, the TBC 12 derives a corrected R-Y signal and a corrected B-Y signal and feeds these signals to output terminals 19 and 20, and an encoder 16.

The TBCs 11 and 12 write related input signals into internal memories while using write clocks generated on the basis of horizontal sync signals in the reproduced and demodulated signals. In addition, the TBCs 11 and 12 perform the time base correction and the time base expansion by reading out the signals from the memories while using readout clock pulses 22B and 23B supplied from a phase shifter 35.

The encoder 16 derives a second reproduced composite chrominance signal from the input R-Y signal and the B-Y signal through an encoding process using a reference chrominance subcarrier supplied from the sync generator 15. The encoder 16 outputs the composite chrominance signal to the adder 17. The composite chrominance signal and the Y signal are added by the device 17, forming a reproduced composite video signal which is supplied to an output terminal 21.

The chrominance subcarrier outputted from the sync signal generator 15 is synchronized with a reference signal, for example, a reference video signal, fed to the generator 15 via an input terminal 14. In the absence of the reference signal, the chrominance subcarrier is free-running. The phase relationship between the chrominance subcarrier and the reference signal is adjustable in accordance with an adjustment signal fed to the sync signal generator 15 via an input terminal 32.

The sync signal generator 15 produces primary readout clocks 22A and 23A on the basis of the reference signal supplied via the input terminal 14. Phases of the primary readout clocks 22A and 23A are adjustable in accordance with an adjustment signal fed to the sync signal generator 15 via an input terminal 31. The phase shifter 35 converts the primary readout clocks 22A and 23A into the final readout clocks 22B and 23B through a phase shifting process. Degrees of the phase shifts are adjustable in accordance with a phase difference signal supplied from a phase comparator 34 to the phase shifter 35.

The reference phase signal added during the recording process is extracted by the device 33 from the Y signal outputted from the TBC 11. The extracted reference phase signal is applied to the phase comparator 34. The device 34 compares the phase of the extracted reference phase signal and the phase of the chrominance subcarrier fed from the sync signal generator 15, generating the phase difference signal representing a difference between the compared phases and outputted to the phase shifter 35. The phase shifter 35 controls the phases of the readout clocks 22B and 23B in accordance with the phase difference represented by the phase difference signal. During the generation of the Y signal, the R-Y signal, and the B-Y signal, the TBCs 11 and 12 read out the reproduced signals from the internal memories at rates and timings determined by the readout clocks 22B and 23B. Accordingly, the timings of the signal readout in the TBCs 11 and 12 are controlled in accordance with the phase difference between the extracted reference phase signal and the chrominance subcarrier. This control is designed so as to allow the final reproduced Y signal, the final reproduced R-Y signal, and the final reproduced B-Y signal to have a residual chrominance subcarrier of the input composite video signal which is of the same or essentially the same phase as the chrominance subcarrier generated by the sync signal generator 15. Accordingly, the final reproduced composite video signal is held satisfactory.

A color frame signal detector 44 receives a reproduced control pulse signal from the magnetic head 43. The detector 44 derives a color frame signal from the reproduced control pulse signal. The color frame signal represents the color frame information. The color frame signal outputted from the detector 44 is applied to a comparator 47.

The sync signal generator 15 produces a basic color frame signal depending on color frame components of the reference signal supplied via the input terminal 14. The basic color frame signal is applied to a color frame signal generator 45. In the presence of the reference signal applied to the input terminal 14, the generator 45 derives a second color frame signal from the basic color frame signal. In the absence of the reference signal, the generator 45 derives a second color frame signal in a self-running manner. The color frame signal outputted from the generator 45 is applied to an output terminal 46 and a switch 48.

During a normal reproducing process, the switch 48 transmits the color frame signal from the generator 45 to the comparator 47. The device 47 compares the color frame signals outputted from the generator 45 and the detector 44, generating a control signal depending on a difference between the color frame signals. The control signal is applied to a tape speed servo control system. The servo control system adjusts the speed of the magnetic tape, that is, the rate of the signal reproduction, in accordance with the difference between the color frame signals represented by the input control signal. The servo control system is designed so as to equalize the color frames represented by the color frame signals, maintaining the quantity of the control via the phase shifter 35 within a predetermined range where no inversion occurs, thus preventing rightward or leftward shift of reproduced images on a screen. In this way, the color frames of the signal reproduced from the magnetic tape are held essentially equal to the color frames of the output from the sync signal generator 15, that is, the video output.

The servo control system includes a capstan motor drive circuit 60 receiving the output signal from the comparator 47 and generating a drive signal in accordance with the output signal from the comparator 47. The servo control system also includes a capstan motor 61 receiving the drive signal and controlling a speed of a magnetic tape 70 at a speed determined by the drive signal.

During an editing process, a color frame signal of an input video signal to be recorded subsequently is supplied to the comparator 47 via an input terminal 250 and the switch 48. In this case, the comparator 47 uses the color frame signal supplied via the input terminal 250 in place of the color frame signal supplied from the generator 45. The comparator 47 and the servo control system operate in a way similar to the operation during the previously-mentioned normal reproducing process. The servo control allows acceptable continuity of color frames across boundaries or joins, preventing shift of displayed images during a playback process of the edited magnetic tape.

The color frame signal outputted from the generator 45 is transmitted via the output terminal 46 during a component dubbing process. The transmitted color frame signal is used in color frame servo control during an editing process and a recording process. The color frame signal outputted from the detector 44 may be transmitted via the output terminal 46 in place of the color frame signal outputted from the generator 45.

Figure 4:
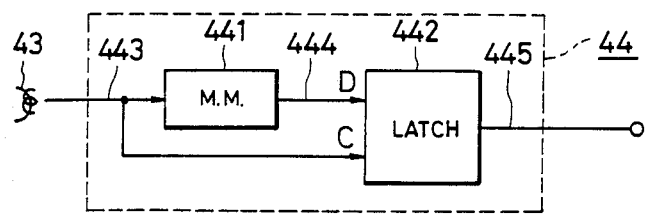
FIG. 4 is a block diagram of the color frame detector of FIG. 2.

As shown in FIG. 4, the color frame detector 44 includes a monostable multivibrator (MM) 441 and a latch 442. A reproduced control pulse signal 443 derived via the magnetic head 43 is inputted into the multivibrator 441 and the latch 442. An output signal 444 from the multivibrator 441 is also applied to the latch 442. The latch 442 generates a color frame signal 445 in accordance with the input signals 443 and 444.

Figure 5:
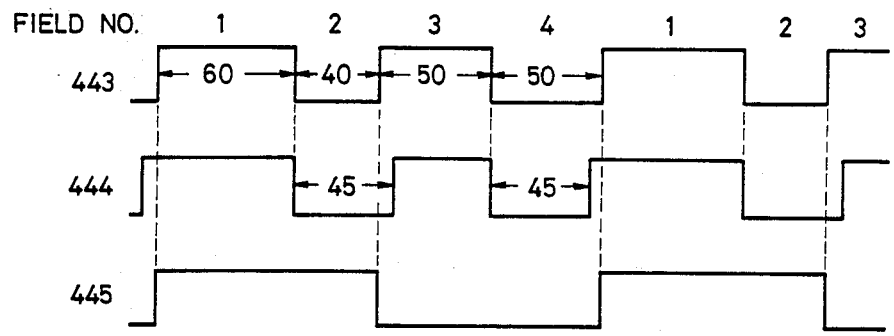
FIG. 5 shows waveforms of signals in the color frame detector of FIG. 4.

As shown in FIG. 5, the control pulse signal 443 has a longer positive pulse and a shorter negative pulse in each pair of adjacent first and second fields. The multivibrator 441 is triggered by negative going voltage changes in the control pulse signal 443, outputting negative pulses 444 with equal durations. The latch 442 samples the output signal 444 from the multivibrator 441 at moments of the occurrence of positive going voltage changes in the control pulse signal 443, holding each sample until a subsequent sample is obtained. The resulting color frame signal 445 outputted from the latch 442 assumes a higher lever state during each pair of adjacent first and second fields and a lower level state during each pair of adjacent third and fourth fields.

It should be noted that the color frame generator 45 may be omitted and the sync signal generator 15 may produce a color frame signal directly applied to the output terminal 46 and the switch 48.

DESCRIPTION OF THE SECOND PREFERRED EMBODIMENT

Figure 6:
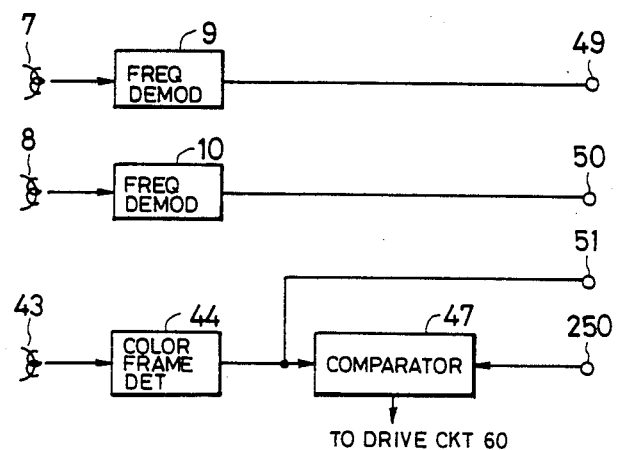
FIG. 6 is a block diagram of a reproducing section of a video signal recording and reproducing apparatus according to a second embodiment of this invention.

FIG. 6 shows a reproducing section of a video signal recording and reproducing apparatus according to a second embodiment of this invention. A recording section of the second embodiment is similar to the recording section of the embodiment of FIGS. 1–5. The reproducing section of FIG. 6 is similar to the reproducing section of FIG. 2 except for design changes indicated hereinafter.

As shown in FIG. 6, a reproduced Y signal outputted from a frequency demodulator 9 is directly applied to an output terminal 49. A reproduced composite chrominance signal outputted from a frequency demodulator 10 is directly applied to an output terminal 50. A reproduced color frame signal outputted from a detector 44 is applied to an output terminal 51. The switch 48 (see FIG. 2) is removed and an input terminal 250 is directly connected to a comparator 47.

During a simple reproducing process which dispenses with color frame control, serve control responsive to an output signal from the comparator 47 is disabled and the color frame signal derived via the detector 44 is transmitted via the output terminal 51.

During an editing process, a color frame signal produced from another input video signal is applied to the comparator 47 via the input terminal 250, and the color frame signal outputted from the detector 44 is applied to the comparator 47. Accordingly, the two input color frame signals are compared by the device 47 and a servo control system is adjusted in accordance with an output from the device 47 so that the two input color frame signals will be essentially equalized. In this way, continuity of color frames are maintained when the operation of the recording and reproducing apparatus changes from a reproducing process to a recording process.

MODIFICATIONS

It should be noted that various modifications may be made in this invention. For example, color frames in video signals handled by a recording section and a reproducing section may be made equal to an external reference signal synchronous with an input video signal.

A color frame signal may be outputted in a manner such that the color frame signal is superposed over vertical blanking portions of at least one of chrominance signals.

One or two composite signals formed by combinations of a luminance signal and two chrominance signals through a time base compression process may be inputted into the recording and reproducing apparatus.

What is claimed is:

1. A video signal recording and reproducing apparatus comprising:
   (a) an input terminal receiving a video signal;
   (b) means for recording the video signal, received by the input terminal, as component signals;
   (c) means for generating a color frame signal from color frame information contained in the video signal received by the input terminal;
   (d) means for recording the color frame signal generated by the generating means;
   (e) means for reproducing the component signals recorded by the recording means (b) and for reproducing the color frame signal recorded by the recording means (d); and
   (f) output terminals outputting the component signals reproduced by the reproducing means and outputting the color frame signal reproduced by the reproducing means.

2. A video signal recording and reproducing apparatus comprising:
   (a) an input terminal receiving a video signal;
   (b) an input terminal receiving a color frame signal;
   (c) means for recording the video signal, received by the input terminal receiving the video signal, as component signals;
   (d) means for recording the color frame signal received by the input terminal receiving the color frame signal;
   (e) means for reproducing the component signals recorded by the recording means (c) and for reproducing the color frame signal recorded by the recording means (d); and
   (f) output terminals outputting the component signals reproduced by the reproducing means and outputting the color frame signal reproduced by the reproducing means.

3. A video signal recording and reproducing apparatus wherein at least one of a first signal set including luminance and two chrominance signals derived from a composite video signal and a second signal including directly received luminance and two chrominance signals are recorded on a medium and reproduced from said medium, and at least reproduced signals under component conditions are outputted, the apparatus comprising:
   (a) means for recording color frame information of an input video signal, wherein the color frame information is generated independent of the input video signal when the input video signals fails to have color frame information;

(b) means for performing servo control of a speed and a phase of reproduction of the luminance and chrominance signals on the basis of the color frame information recorded by the recording means; and (c) output terminals outputting the color frame information together with component signal outputs.

4. A video signal recording and reproducing apparatus wherein at least one of a first signal set including luminance and two chrominance signals derived from a composite video signal and a second signal including directly received luminance and two chrominance signals are recorded on a medium and reproduced from said medium, a composite video signal is obtained by modulating two chrominance signals and combining the modulated chrominance signals and a luminance signal, and at least reproduced signals under component conditions are outputted, the apparatus comprising:

(a) means for recording color frame information of an input video signal, wherein the color frame information is generated independent of the input video signal when the input video signal fails to have color frame information, and for also recording a first signal when a standard composite video signal is inputted, the first signal representing a phase of a chrominance subcarrier in the input composite video signal;

(b) means for performing servo control of a speed and a phase of production of the luminance and two chrominance signals on the basis of the color frame information recorded by the recording means;

(c) means for controlling a phase relationship between the reproduced luminance and two chrominance signals and a phase of the chrominance subcarrier modulated with the two chrominance signals on the basis of the first signal; and (d) output terminals outputting the color frame information together with component signal outputs.

5. The apparatus of claim 4 wherein the color frame information is recorded in a manner as to be superposed over a control signal.

6. A video signal reproducing apparatus comprising:

(a) means for reproducing a first color frame signal from a recording medium holding the first color frame signal and a video signal;

(b) means for reproducing the video signal from the recording medium;

(c) means for generating a second color frame signal;

(d) means for comparing the first color frame signal reproduced by the reproducing means with the second color frame signal generated by the generating means;

(e) color frame servo means for equalizing the first and second color frame signals on the basis of result of said comparing by the comparing means between the first and second color frame signals; and (f) output terminals outputting the first or second color frame signal together with the video signal.

7. A video signal recording and reproducing apparatus comprising:

(a) first recording means for recording component video signals;

(b) second recording means for recording a color frame signal simultaneously with said recording of the component video signals by the first recording means, the color frame signal relating to the component video signals and representing color frames;

(c) first reproducing means for reproducing the component video signals recorded by the first recording means; and (d) second reproducing means for reproducing the color frame signal, recorded by the second recording means, simultaneously with said reproducing the component video signals by the first reproducing means.

8. The apparatus of claim 7 further comprising means for deriving the component video signals from a composite video signal before the component video signals are recorded by the first recording means, and means for deriving the color frame signal from the composite video signal before the color frame signal is recorded by the second recording means.

9. The apparatus of claim 8 wherein the color frame signal deriving means comprises means for generating the color frame signal on the basis of the composite video signal when the composite video signal having color frame components and means for generating the color frame signal independent of the composite video signal when the composite video signal fails to have color frame components.

10. The apparatus of claim 7 further comprising means for deriving a difference between the color frame signal reproduced by the second reproducing means and a reference color frame signal, and means for controlling a rate of said reproducing of the component video signals by the first reproducing means in accordance with the difference derived by the difference deriving means.

* * * * *